United States Patent
Alattar et al.

(10) Patent No.: US 10,579,984 B2
(45) Date of Patent: Mar. 3, 2020

(54) METHOD FOR MAKING CONTACTLESS TRANSACTIONS SECURE

(71) Applicant: ORANGE, Paris (FR)

(72) Inventors: Mouhannad Alattar, Caen (FR); Mohammed Achemlal, Caen (FR)

(73) Assignee: Orange, Paris (FR)

( * ) Notice: Subject to any disclaimer, the term of this patent is extended or adjusted under 35 U.S.C. 154(b) by 434 days.

(21) Appl. No.: 15/538,190

(22) PCT Filed: Dec. 17, 2015

(86) PCT No.: PCT/FR2015/053582
§ 371 (c)(1),
(2) Date: Jun. 20, 2017

(87) PCT Pub. No.: WO2016/102830
PCT Pub. Date: Jun. 30, 2016

(65) Prior Publication Data
US 2017/0359358 A1      Dec. 14, 2017

(30) Foreign Application Priority Data

Dec. 23, 2014   (FR) ..................... 14 63263

(51) Int. Cl.
*G06Q 20/32*       (2012.01)
*G06Q 20/38*       (2012.01)
(Continued)

(52) U.S. Cl.
CPC .......... *G06Q 20/322* (2013.01); *G06Q 20/12* (2013.01); *G06Q 20/3227* (2013.01);
(Continued)

(58) Field of Classification Search
CPC ................. G06Q 20/322; G06Q 20/3227
See application file for complete search history.

(56) References Cited

U.S. PATENT DOCUMENTS 5,963,649 A * 10/1999 Sako ................. H04L 9/3247
                                                                            380/30
9,589,268 B2 * 3/2017 Hammad ............... G06F 21/34
(Continued)

OTHER PUBLICATIONS

"A solution to the Mobile Wallet Conundrum" Cortex MCP, 2014.
(Continued)

*Primary Examiner* — Steven S Kim
(74) *Attorney, Agent, or Firm* — Haverstock & Owens LLP

(57) ABSTRACT

The invention relates to a method for making a transaction of a contactless application secure, said application (11) being stored in the mobile terminal (10), said transaction taking place between the mobile terminal and a contactless reader (12), said terminal including a security element (14), said method comprising the following steps carried out by the mobile terminal: the application sends (E13) a token representing a piece of sensitive data and a first authentication value relating to the token to the reader, the security element receives (E16) the token and the related first authentication value from the reader, the security element calculates (E17) a second authentication value from the received token and compares the first authentication value with the second authentication value, and sending (E18) the result of the comparison to the reader, said reader cancelling the transaction if the result is negative.

5 Claims, 2 Drawing Sheets

(51) Int. Cl.
*H04W 12/02* (2009.01)
*G06Q 20/34* (2012.01)
*H04W 12/12* (2009.01)
*G06Q 20/12* (2012.01)
*H04L 29/06* (2006.01)

(52) U.S. Cl.
CPC ..... *G06Q 20/3229* (2013.01); *G06Q 20/3278* (2013.01); *G06Q 20/352* (2013.01); *G06Q 20/3827* (2013.01); *H04L 63/12* (2013.01); *H04W 12/02* (2013.01); *H04W 12/1208* (2019.01)

(56) References Cited

U.S. PATENT DOCUMENTS

| | | | | |
|---|---|---|---|---|
| 2005/0100166 A1* | 5/2005 | Smetters | ............ | H04L 63/0492 380/277 |
| 2009/0185679 A1* | 7/2009 | Haider | ................ | G06F 21/645 380/30 |
| 2013/0097083 A1* | 4/2013 | Fisher | ................ | H04W 4/21 705/44 |
| 2014/0074637 A1* | 3/2014 | Hammad | ............ | G06Q 20/325 705/21 |
| 2015/0178724 A1* | 6/2015 | Ngo | ................ | H04L 9/0869 705/71 |
| 2015/0348026 A1* | 12/2015 | Roberts | ................ | G06Q 20/10 705/71 |
| 2016/0005042 A1* | 1/2016 | Tervo | ................ | G06Q 20/4014 705/67 |
| 2016/0379101 A1* | 12/2016 | Hammad | ............ | G06K 19/06206 235/380 |
| 2017/0330184 A1* | 11/2017 | Sabt | ................ | G06Q 20/3278 |
| 2018/0165673 A1* | 6/2018 | Francis | ................ | G06F 21/57 |
| 2018/0212784 A1* | 7/2018 | Guichard | ............ | H04L 63/0823 |

OTHER PUBLICATIONS

"Host Card Emulation (HCE) 101", A Smart Card Alliance Mobile & NFC Council White Paper, Aug. 2014, MNFCC-14002.

"HCE and SIM Secure Element: It's Not Black and White", consult hyperion.

* cited by examiner

METHOD FOR MAKING CONTACTLESS TRANSACTIONS SECURE

The present invention relates to a method for making contactless transactions secure.

A particularly useful application of the invention is the securing of sensitive contactless services, such as services for payment on intelligent mobile terminals (or "smartphones" as they are known in English).

There are known sensitive contactless services on mobile terminals. The terminals are usually equipped with a security element designed to store a sensitive application, together with the user's sensitive data required for the execution of the application. Recently, the introduction of a card emulation environment (or HCE, for "Host Card Emulation") into intelligent mobile terminals has enabled contactless services to be provided independently of a security element. This environment enables the mobile terminal to act as a smart card. In an HCE architecture, the sensitive applications are installed and executed in the operating system of the mobile terminal which acts as the "host" (as it is known in English) of these applications. This solution has the advantage of facilitating the deployment and updating of services. This is because the execution and management architectures are simpler, requiring fewer technical components and fewer actors. However, it is known that applications on mobile devices and the operating system on which they depend do not offer the same level of security as applications based on a security element.

In order to overcome these weaknesses and provide a certain level of security, it has been proposed that, for services requiring a high level of security, substitute data called "tokens" should be used to minimize the risks of compromise. The tokens are temporary or one-time authentication data. Thus, it is no longer necessary to store permanently sensitive data such as personal account numbers (or "PAN", for "Personal Account Number"), "PIN" codes (for "Personal Identification Number") and keys. For example, in the context of a payment service, instead of directly using a bank account number in a contactless transaction with a contactless reader, the terminal supplies the reader with a disposable account number (known as a "tokenized PAN" in English) when the reader requests the account number. The reader then transmits the token to a clearing entity which interfaces with a token supplier which has delivered the token. The token supplier verifies that the token presented for clearing is valid, and supplies the associated account number to the clearing entity. The clearing entity uses the account number to complete the payment authorization request of the transaction.

However, using a token in place of a sensitive piece of data does not resolve all the security problems. Thus, a sensitive service remains vulnerable to relay attacks. For example, an attacker may install a Trojan virus on the user's terminal without the user's knowledge. The virus may relay a valid token which is recorded on the user's terminal to another terminal controlled by the attacker. The attacker may use the token in the execution of a payment service on the terminal that he controls, and may execute a payment transaction using this token. Ultimately, the bank account of the victim of the attack is debited.

One of the objects of the invention is to overcome some deficiencies and/or drawbacks of the prior art and/or to make improvements thereto.

To this end, the invention proposes a method for making a transaction of a contactless application secure, said application being stored in the mobile terminal, said transaction being executed between the mobile terminal and a contactless reader, said terminal comprising a security element, said method comprising the following steps, executed by the mobile terminal:
  the application sends to the reader a token representing a sensitive piece of data and a first authentication value associated with the token,
  the security element receives the token and the first associated authentication value from the reader,
  the security element calculates a second authentication value on the basis of the received token and compares the first and the second authentication values, and
  the result of the comparison is sent to the reader, said reader terminating the transaction if the result is negative.

With the method for making a transaction secure described here, when the reader requests a token, as a substitute piece of data for a sensitive piece of data, from the contactless application, the token is verified by the security element. More precisely, an authentication value, depending on the security element, is associated with the token in order to verify the integrity of the token at the moment of its use. Thus the token can be used only by the terminal for which it is intended. The relaying of this token by a Trojan to the attacker's terminal will be detected. This is because the security element of this second terminal cannot verify the integrity of the token, because the verification of the authentication message associated with the token is not positive.

The method described here also allows the execution of transactions offline, that is to say when the remote server cannot be accessed. This is because the verification of the token performed by the security element assures the contactless reader that the token is valid. With the proposed solution, the reader immediately verifies whether the token is corrupt or used by a different terminal from that for which it was intended. Consequently, by contrast with the existing solutions, a corrupt token is not transmitted to the payment network.

According to an exemplary embodiment, the method for making a transaction secure comprises the following steps:
  the application sends a token request to a server,
  the application receives the authorization token and the first authentication value from the server,
  the security element is requested to validate the token,
  the security element calculates a third authentication value on the basis of the received token and compares the first and the third authentication values, and sends the result of the comparison to the application, the token being valid if the result is positive.

During this preliminary phase, one or more tokens are installed in a secure manner on the mobile terminal. These tokens are intended to be used by the payment application in a transaction. The preliminary phase ensures that the server sends the tokens to the correct mobile terminal, and conversely that the mobile terminal receives the tokens from an authentic server. The tokens obtained from the server are verified by conventional cryptographic techniques, for example by means of a secret key shared with the server and used by the latter to generate the authentication message associated with the token, or by means of a public key of the server associated with a private key of the server which the latter has used to generate the authentication value associated with the token. A mutual authentication between the security element and the server is carried out, for example by means of a method based on asymmetric cryptography. The token transmitted from the server to the application on the terminal is verified by the security element, at the request of the application, and the result of this verification is transmitted to the application on the one hand, and to the server on the other hand. Thus the server is assured that it has sent the token to an authentic terminal, and the application is assured that it has received the token from an authentic server.

The invention also relates to a mobile terminal intended to execute a transaction of a contactless application, said terminal storing said application and comprising a security module, said terminal further comprising:

first sending means, arranged so that the application sends to the reader a token representing a sensitive piece of data and a first authentication value associated with the token, receiving means, arranged to receive the token and the first authentication value from the reader, calculation and comparison means, arranged so that the security element calculates a second authentication value on the basis of the received token and compares the first and the second authentication values, and second sending means, arranged to send a result of the comparison to the reader, said reader terminating the transaction if the result is negative.

The invention also relates to a system for making a transaction of a contactless application secure, comprising:

a mobile terminal as described above, and a contactless reader, comprising:

receiving means, arranged to receive the token and the first authentication value associated with the token from the application, sending means, arranged to send the token and the first authentication value to the terminal, receiving means, arranged to receive from the terminal a result of the comparison of the first authentication value and a second authentication value, said result being calculated by the security element, and a server, comprising receiving means arranged to receive a token from the reader during the transaction.

The invention also relates to a computer program on a data medium and which can be loaded into the memory of a mobile terminal, the program comprising code instructions for executing the steps of the method for making a transaction of a contactless application secure, such as that described above, when the program is executed on said terminal.

The invention also relates to a data medium on which the aforesaid program is recorded.

Other characteristics and advantages of the present invention will be more clearly understood from the description and the attached drawings, in which.

Figure 1:
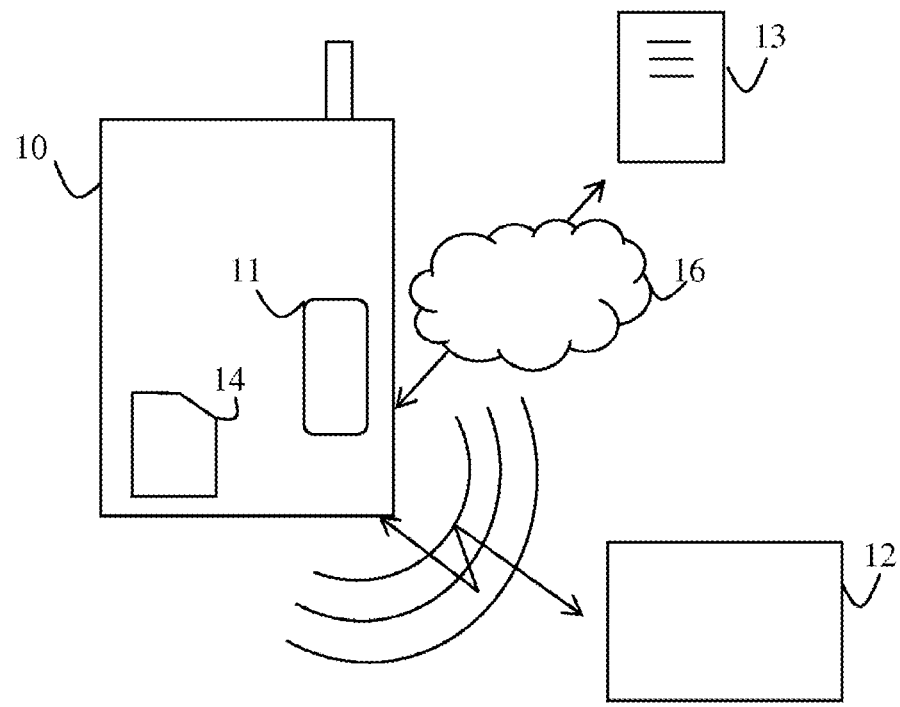
FIG. 1 is a schematic representation of an architecture adapted for the execution of the steps of a method for executing a contactless transaction, according to a first exemplary embodiment of the invention.

An architecture adapted for the execution of the steps of the method for executing a contactless transaction, according to an exemplary embodiment of the invention, will now be described in relation to FIG. 1.

A user (not shown in FIG. 1) has an intelligent mobile terminal 10 (the English term "smartphone" is commonly used) adapted for the execution of contactless services. For this purpose, the mobile terminal 10 stores a contactless application 11, for example a payment application. The payment application 11, and notably the sensitive functions of the application, are stored in the mobile terminal 10 and are intended to be executed on top of the operating system of the terminal 10 according to the HCE ("Host Card Emulation" in English) architecture. This architecture enables the mobile terminal 10 to act as a smart card. With the HCE architecture, there is no need to store the HCE application 11, or at least the sensitive data used by the application, in a security module. The contactless application 11 is arranged to process commands received from the NFC reader 12 via an NFC controller.

The NFC reader 12 is located at a point of sale (the commonly used term is the English term "POS", for "Point Of Sale"). It is connected to a merchant server which is adapted to execute the steps of the payment application that are executed on the merchant side. For the sake of clarity, only the reader 12 is shown in the figure. It is assumed that the merchant side functions are executed by the contactless reader 12.

The mobile terminal 10 also comprises a security element 14 of the type known as "UICC" (from the English "Universal Integrated Circuit Card"), or "eUICC" (for "embedded"), for example a "(U)SIM" (from the English "(Universal) Subscriber Identity Module") card of the SIM card type. The security element 14 is arranged to store sensitive data such as sensitive functions, cryptographic keys of the authentication codes, or the like.

It is assumed that, in a first exemplary embodiment, the security element 14 and a remote server 13 share the knowledge of a secret key $K_s$. The secret key $K_s$ has, for example, been pre-installed in the security element 14 and in the remote server 13 in a preliminary configuration phase executed when the user subscribed to the payment service. This installation has been carried out according to a known method which is not described here, for example by means of an "OTA" (from the English "Over The Air") procedure. The secret key $K_s$ belongs to the user who holds the mobile terminal 10. It is intended to be used to verify the authenticity of tokens that are supplied from the remote server 13 to the HCE services of the mobile terminal 10, for example to the application 11. A token corresponds to a transaction number or to a substitute value which is used to replace a sensitive piece of data. For example, in the context of the payment application 11, instead of directly using a bank account number in a contactless transaction, the terminal 10 supplies the reader 12 with a token as to a substitute value when the reader requests the account number. The reader 12 then transmits the token to a clearing entity which interfaces with a token supplier which has delivered the token (the clearing entity and the token supplier are not shown in FIG. 1). The token supplier verifies that the token is valid, and supplies the associated account number to the clearing entity. The clearing entity uses the account number to complete the payment authorization request of the transaction.

In a second exemplary embodiment, the security element 14 and the server 13 each have a pair of public and private keys. The server 13 has the pair $Kpub_s/Kpriv_s$ and the security element 14 has the pair $Kpub_e/Kpriv_e$. Each of the entities knows the public key of the other, by using X509 certificates for example, or by accessing a directory of public keys. The pair of keys and the certificate associated with the remote server 13 and with the security element 14 are generated by the service provider according to known methods which are not described here. The pair of keys $Kpub_s/$ Kpriv$_s$ of the server 13 is intended to be used in the generation of tokens for all the terminals. More precisely, the private key Kpriv$_s$ of the server 13 is intended to be used to sign tokens generated by the server 13 and to create authentication values associated with the tokens and for the purpose of verifying the authenticity of the tokens. The private key/public key pair Kpub$_s$/Kpriv$_s$ of the server 13 is also intended to authenticate the server 13 at the security element 14. In a variant embodiment, the pair of keys used for the authentication of the server 13 at the security element 14 is different from the pair of keys used to create the tokens. The pair of keys Kpub$_e$/Kpriv$_e$ of the security element 14 is intended to be used to authenticate the security element 14 at the server 13. The pairs of keys of the remote server 13 and of the security element 14 have been pre-installed in a preliminary configuration phase, by means of an OTA procedure for example.

The security module 14 is arranged to be authenticated at the remote server 13 and to authenticate the server before the tokens are downloaded to the mobile terminal. The security module 14 is arranged to ensure that a token comes from an authentic server, and that it has not been corrupted during downloading. Finally, the security module 14 is arranged to ensure that the HCE application 11 has supplied a valid token to the contactless reader 12 during a current transaction.

The remote server 13 is intended to distribute tokens to HCE services, for example to the application 11, which request them from a token supplier (or "TSP", for "Token Service Provider" in English). In a first exemplary embodiment, the remote server 13 generates tokens and acts as the token supplier. In another exemplary embodiment, the remote server 13 obtains the tokens from a token supplier which generates and distributes them on request. The remote server 13 is adapted to communicate with the payment application 11 and with the security module 14 via the internet 15.

The steps of a method for making a contactless transaction secure, according to an exemplary embodiment, will now be described in relation to FIG. 2.

In a first exemplary embodiment, it is assumed that, in an initial state, a secret key K$_s$ has been installed in the security module 14 of the mobile terminal 10 and in the remote server 13. It is also assumed that each of these entities has a public key/private key pair for authentication, the public key being accessible by the other entity, by means of X.509 public key certificates for example. The pairs of keys are intended to be used in a mutual authentication between the security element 14 and the server 13.

In a first phase P0 for obtaining tokens, the payment application 11 requests and obtains from the remote server 13, in a secure manner, one or more tokens intended to be used subsequently during one or more payment transactions.

For this purpose, in an initial step E01 of sending a request, the payment application 11 sends a request REQ_TOK for tokens to the remote server 13. The request is routed via the internet 15, for example. The request REQ_TOK comprises, for example, an identifier of the application ID_Serv, an identifier of the security element ID_Sec, and a value corresponding to a number of tokens required. It is assumed here that a single token is required. The identifier of the security element ID_Sec is a value that was assigned to the security element 14 when the user subscribed to a first service. It is assumed that the identifier belongs to all the services of a same type, for example all the payment services. The request is received by the server 13 in a reception step E02.

In a subsequent authentication step E03, mutual authentication is carried out between the remote server 13 and the security element 14 of the mobile terminal 13. Any known method of authentication may be used here. For example, a method based on public key cryptography and a challenge/response may be used. At the end of this step, the security element 14 is assured that it is dealing with an authentic server 13, and the server 13 is assured that it is dealing with an authentic security element.

In a subsequent step E04 of generation, the server 13 generates a token, denoted Token, and a first authentication value Token_tag for this token. The token Token is, for example, a random value generated by the server 13. In the example described here, the token has a validity time Tval defined by configuration. The validity time Tval, which is optional, is intended to limit the period of validity of a token, in order to limit the risks of fraudulent use of a token. It is configurable, and may depend on the services, a choice made by the user, or other factors. In other exemplary embodiments, the token may be limited to use with certain merchants, or use at a precise date, or may be limited in other ways.

The first authentication value Token_tag is generated by applying an encryption algorithm, parameterized by the secret key K$_s$ shared with the security element 14, to the token Token, to the service identifier ID_Serv belonging to the payment application 11, to the validity time Tval, and to the identifier of the security element ID_Sec. For example, the encryption algorithm used is "HMAC" (for "Hashed-Keyed Message Authentication Code" in English). In other words, the server generates Token_tag=HMAC$_{Ks}$(Token, ID_Serv, Tval, ID_Sec). Thus, the token Token depends on the security element 14 by its associated authentication value.

In a subsequent sending step E05, the server 13 sends the token Token, the validity time Tval, and, optionally, the identifier of the security element ID_Sec and the first authentication value Token_tag, to the payment application 11. This information is received by the payment application 11 in a reception step E06.

In a subsequent sending step E07, the payment application 11 sends the token Token, the service identifier ID_Serv, the validity time Tval, and, optionally, the identifier of the security element ID_Sec and the first authentication message Token_tag, to the security element 14. This information is received by the security element 14 in a reception step E08.

The security element 14 verifies the authentication token Token in a verification step E09. For this purpose, it calculates a second authentication value Token_tag' by applying the same encryption algorithm as that used in step E04. The algorithm is parameterized by the secret key K$_s$ which it shares with the remote server 13, and is applied to the token Token, to the service identifier ID_Serv, and to the validity time Tval, all of which it has received in step E08, and to the identifier of the security element ID_Sec, which it knows. In other words, it calculates Token_tag'=HMAC$_{Ks}$(Token, ID_Serv, Tval, ID_Sec). It compares the second authentication value Token_tag' with the first authentication value Token_tag. The security element 14 sends the result of the comparison to the server 13 on the one hand, and to the payment application 11 on the other hand, in a step E010 of sending a comparison result. In an exemplary embodiment, the sending of the result is made secure by means of a signature. The result of the comparison is received by the server 13 in a step E011, and by the application 11 in a step E012. If the two values are identical and the result of the comparison is positive, the remote server 13 is assured that the token Token has been sent to the correct mobile terminal. In another case, in which the comparison result is negative, indicating a problem in the sending of the token, the payment application 11 and the server 13 delete the token Token.

The phase P0 of obtaining a token may be executed before the execution of a payment transaction, or independently. In this case, one or more tokens are available in the terminal 10, and may be used by the payment application 11 for subsequent payment transactions.

In a subsequent transaction phase P1, the user who is the holder of the mobile terminal 10 executes the payment application 11.

In an initial step E10, the user starts the payment application 11, and brings his mobile terminal 10 toward the contactless reader 12. Exchanges take place between the contactless reader 12 and the HCE application 11. For example, information messages such as the sum of the current transaction are displayed on the screen of the terminal 10 for the user.

In a subsequent token request step E11, the NFC reader sends a token request req_Token to the payment application 11. At this stage, the contactless reader 12 requires a sensitive piece of data, for example a bank account number. The token is intended to replace the sensitive piece of data. The token request req_Token is received by the application 11 in a reception step E12.

In a token sending step E13, the application 11 responds to the contactless reader 12 by sending it the token Token, the authentication value Token_tag associated with this token, the validity time Tval, the service identifier ID_Serv, and, optionally, the identifier ID_Sec of the security element 14. These data are received by the reader in a reception step E14.

In a subsequent verification request step E15, the reader 12 sends to the security module 14 the token Token, the associated authentication message Token_tag, the validity time Tval, the service identifier ID_Serv, and the identifier ID_Sec of the security element 14, all of which were received in step E14. The contactless reader 12 and the security module 14 communicate in contactless mode by means of the application 11. Thus, the reader sends the data that it has received to the application 11, which relays them to the security element 14. The contactless communication link is considered secure, because of the short distance between the reader 12 and the mobile terminal 10 at the moment of the transaction. These data are received by the security element 14 in a step E16.

In a subsequent checking step E17, the security element 14 generates a third authentication value Token_tag" for the token Token. The security element 14 applies the same encryption algorithm as that used in phase P0 for obtaining tokens, parameterized by the secret key $K_s$ which it shares with the remote server 13, to the token Token, to the service identifier ID_Serv, and to the validity time Tval, all of which it has received in step E16, and to the identifier ID_Sec of the security element 14. In other words, it calculates Token_tag"=$HMAC_{Ks}$(Token, ID_Serv, Tval, ID_Sec). It then compares the third calculated authentication value Token_tag" to the one that it received in step E16. In an exemplary embodiment, the security element verifies whether the validity time Tval of the token has expired. The security element 14 sends the result of the comparison to the contactless reader 12 in a step E18. In an exemplary embodiment, the sending is made secure by means of a signature. The result of the comparison is received by the reader 12 in a step E19.

Figure 2:
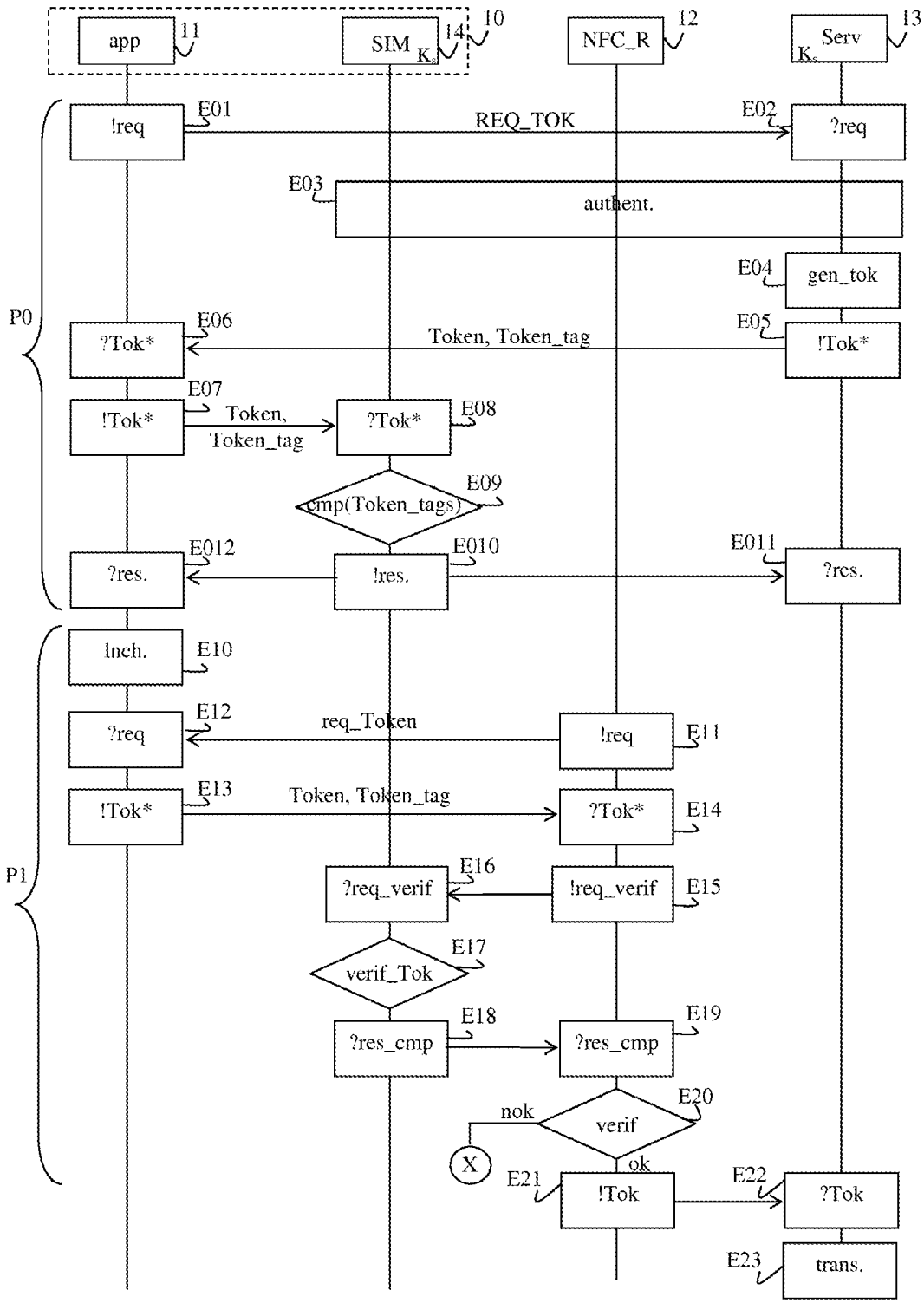
FIG. 2 shows the steps of a method for executing a contactless transaction, according to a first exemplary embodiment of the invention.

In a verification step E20, the NFC reader 12 verifies the result of the comparison and terminates the current transaction if the result of the comparison is negative (the "nok" branch in FIG. 2). In another case (the "ok" branch in FIG. 2), the reader sends the token to the server 12, in a token sending step E21, to complete the authorization request and terminate the current transaction. The token is received by the server in a reception step E22. The transaction is finalized in a subsequent step E23.

In a second exemplary embodiment, shown in FIG. 2b, the generation and verification of the tokens are based on public key cryptography. Thus, the security element 14 and the server 13 each have a pair of public and private keys. The server 13 has the pair $Kpub_s/Kpriv_s$ and the security element has the pair $Kpub_e/Kpriv_e$.

In this example, the first authentication value of the token calculated by the server 13 in the generation step E04 is obtained by applying a hash function to the concatenation of the token Token, the service identifier ID_Serv, the validity time Tval and the identifier of the security element ID_Sec, and by signing the resulting hash by means of the private key $Kpriv_s$. The hash function is, for example, "SHA-2" (for "Secure Hash Algorithm"). In other words, the server 13 calculates hash(Token, ID_Serv, Tval, ID_Sec) and signs this hash by encrypting it with its private key $Kpriv_s$.

In the verification step E09, the security element 14 verifies the authentication token Token, in a conventional way, by means of the public key $Kpub_s$ of the server 13. For this purpose, it calculates a second authentication value by applying the same hash function to the concatenation of the token, the service identifier ID_Serv, the validity time Tval and the identifier ID_Sec of the security element 14, and applies a signature verification algorithm, parameterized by the public key of the server $Kpub_s$, to the piece of data obtained and to the signature that it has received.

Similarly, the security element checks the token Token in step E17 of checking the transaction phase P1.

Figure 3:
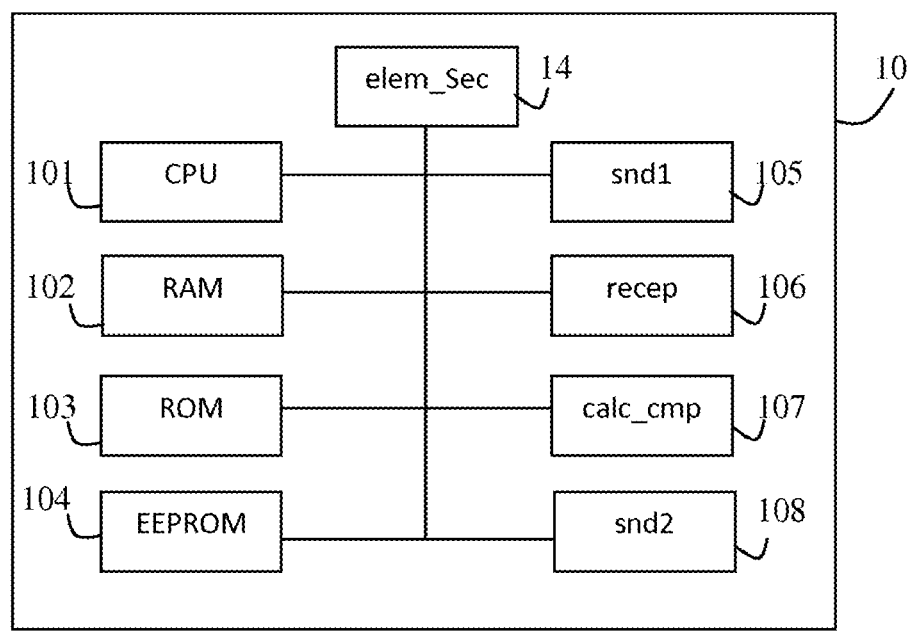
FIG. 3 is a schematic functional representation of a mobile terminal, according to an exemplary embodiment of the invention.

A functional description of a mobile terminal 10 according to a first exemplary embodiment of the invention will now be given with reference to FIG. 3.

The mobile terminal 10 is an intelligent terminal, or smartphone as it is known in English, according to an HCE architecture. According to the HCE architecture, the mobile terminal 10 emulates a contactless card, and hosts contactless applications at the level of the operating system. The terminal 10 communicates directly with a contactless reader 12 located nearby, via contactless interfaces.

The mobile terminal 10 comprises:
- a processing unit 101, or "CPU" for "Central Processing Unit", arranged for executing code instructions,
- a set of memories, including a volatile memory 102 and a read-only memory 103 of the type known as "ROM" (from the English "Read Only Memory") and a storage memory 104 which may be a flash memory or an "EEPROM" (for "Electrically-Erasable Programmable Read Only Memory"). The volatile memory 102 is arranged to store variables, to store temporary results of the executions of instructions, etc. The storage memory 104 is arranged to store data. In particular, the storage memory 104 stores contactless applications, for example the payment application 11 which comprises code instructions for executing the steps of the method for making a contactless transaction secure which are executed by the payment application 11; and
- a security element 14. In an exemplary embodiment, the security element 14 is a subscriber identity card, or SIM card. The security element 14 is arranged to store sensitive data such as secret keys, authentication codes, and the like. In an exemplary embodiment, the security element 14 stores a secret key $K_s$, the knowledge of which it shares with the remote server 13 (not shown in FIG. 3). In a second exemplary embodiment, the security element 14 stores at least one private key of a private key/public key pair $Kpriv_e/Kpub_e$. In this second example, it also stores a public key of the remote server 13 from a private key/public key pair $Kpriv_s/Kpub_s$ of the server 13;

The mobile terminal 10 also comprises:

a first sending module 105, arranged so that the application 11 sends to the reader 12 a token Token representing a sensitive piece of data and a first authentication value Token_Tag associated with the token, a receiving module 106, arranged to receive the token and the first authentication value from the reader. The receiving module 106 is arranged to execute step E16 of the method for making a contactless transaction secure, as described above, a calculation and comparison module 107, arranged so that the security element calculates a second authentication value on the basis of the received token and compares the first and the second authentication values. The calculation and comparison module 107 is arranged to execute step E17 of the method described above, and a second sending module 108, arranged to send a result of the comparison to the reader, said reader terminating the transaction if the result is negative. The second sending module 108 is arranged to execute step E18 of the method described above.

The mobile terminal 10 also comprises the following modules, not shown in FIG. 2:

a third sending module, arranged to send a token request to the server. The third sending module is arranged to execute step E01 of the method described above;

a second receiving module, arranged so that the application receives the authorization token and the first authentication value from the server. The second receiving module is arranged to execute step E06 of the method described above;

a validation request module, arranged to request the element to validate the token. The validation request module is arranged to execute step E07 of the method described above;

a calculation and comparison module, arranged so that the security element calculates (E09) a third authentication value on the basis of the received token and compares the first and the third authentication values, and sends the result of the comparison to the application, the token being valid if the result is positive. The calculation and comparison module is arranged to execute step E07 of the method described above.

The modules described above, and notably the first 105 and second 108 sending modules, the receiving module 106 and the calculation module 107 are preferably software modules comprising software code instructions for the execution of those of the steps of the method for making a transaction secure that are executed by the mobile terminal.

The invention therefore also relates to:

a computer program comprising instructions for executing the method for making a contactless transaction secure as described above, when this program is executed by a processor;

a recording medium, readable by a reader on which the computer program described above is recorded.

The software modules may be stored in, or transmitted by, a data medium. This medium may be a hardware storage medium, for example a CD-ROM, a diskette or a hard disk, or a transmission medium such as a signal or a telecommunications network.

The invention also relates to an authentication system comprising:

a mobile terminal as described above, a contactless reader (12), comprising:
    a receiving module, arranged to receive the token and the first authentication value associated with the token from the application,
    a sending module, arranged to send the token and the first authentication value to the terminal,
    a receiving module, arranged to receive from the terminal a result of the comparison of the first authentication value and a second authentication value, said result being calculated by the security element, a server (13), comprising:
    a receiving module, arranged to receive a token from the reader during the transaction.

The modules of the server 13 and of the reader 12 respectively, described above, are preferably software modules comprising software code instructions for the execution of those of the steps of the method for making a transaction secure that are executed by the server, or the reader respectively.

The invention claimed is:

1. A method for making a transaction of a contactless application secure, said contactless application (11) being stored in the mobile terminal (10), said transaction being executed between the mobile terminal and a contactless reader (12), said mobile terminal comprising a security element (14), said method comprising the following steps:
    sending, by the contactless application to the contactless reader, a token representing a sensitive piece of data and a first authentication value associated with the token during said transaction between the mobile terminal and the contactless reader, receiving, by the security element, the token and the first authentication value from the contactless reader,
    calculating, by the security element, a second authentication value on the basis of the received token,
    comparing, by the security element, the first and the second authentication values to obtain a result of the comparison, and
    sending, by the security element, the result of the comparison to the contactless reader, wherein said contactless reader terminating the transaction based on the result of the comparison, wherein the contactless application is executed by an operating system of the mobile terminal independent of the security element.

2. The method as claimed in claim 1, prior to the contactless application sending to the contactless reader the token and the first authentication value, the method further comprises the following steps:
    sending, by the contactless application, a request for the token to a server (13),
    receiving, by the contactless application, the token and the first authentication value from the server,
    sending, by the contactless application, a request to validate the token by sending the token to the security element,
    calculating, by the security element, a third authentication value on the basis of the token received from the contactless application, comparing, by the security element, the first and the third authentication values to obtain a result of the comparison of the first and the third authentication value, and sending, by the security element, the result of the comparison of the first and the third authentication value to the contactless application, the token being valid if the result is positive.

3. A mobile terminal for executing a contactless transaction with a contactless reader, the mobile terminal comprising:

a first processor;
an operating system;
a contactless application; and
a security element comprising a second processor;

wherein the contactless application is programmed to send to the contactless reader, a token representing a sensitive piece of data and a first authentication value associated with the token during said transaction between the mobile terminal and the contactless reader, wherein the contactless application is executed by the operating system independent of the security element;

wherein the contactless reader is programmed to upon receiving the token and the first authentication value from the contactless application, send the token and the first authentication value to the security element;

wherein the security element is programmed to receive the token and the first authentication value from the contactless reader, calculate a second authentication value on the basis of the received token, compare the first and the second authentication value to obtain a result of the comparison, and send the result of the comparison to the contactless reader, wherein the contactless reader terminates the transaction based on the result of the comparison received from the security element.

4. Non-transitory computer readable media storing computer executable instructions when executed by processors cause the processors to perform operations for making a transaction of a contactless application secure, said contactless application (11) being stored in the mobile terminal (10), said transaction being executed between the mobile terminal and a contactless reader (12), said operations comprising:

sending, by the contactless application to the contactless reader, a token representing a sensitive piece of data and a first authentication value associated with the token during said transaction between the mobile terminal and the contactless reader, receiving, by the security element, the token and the first authentication value from the contactless reader, calculating, by the security element, a second authentication value on the basis of the received token, comparing, by the security element, the first and the second authentication values to obtain a result of the comparison, and sending, by the security element, the result of the comparison to the contactless reader, the contactless reader terminating the transaction based on the result of the comparison, wherein the contactless application is executed by an operating system of the mobile terminal independent of the security element.

5. A system for making a transaction of a contactless application secure, comprising:

a mobile terminal comprising:
a first processor;
an operating system;
a contactless application; and
a security element comprising a second processor;
a contactless reader; and
a server;

wherein the contactless application is programmed to send to the contactless reader, a token representing a sensitive piece of data and a first authentication value associated with the token during said transaction between the mobile terminal and the contactless reader, wherein the contactless application is executed by an operating system of the mobile terminal independent of the security element;

wherein the contactless reader is programmed to upon receiving the token and the first authentication value from the contactless application, send the token and the first authentication value to the security element;

wherein the security element is programmed to receive the token and the first authentication value from the contactless reader, calculate a second authentication value on the basis of the received token, compare the first and the second authentication value to obtain a result of the comparison, and send the result of the comparison to the contactless reader;

wherein the contactless reader is further programmed to receive the result of the comparison from the security element and send the token to the server based on the result of the comparison;

wherein the server is programmed to receive the token from the reader during the transaction.

* * * * *